3,732,203
PROCESS FOR THE PREPARATION OF CARDENO-
LIDE- AND BUFADIENOLIDE - 3-[GLYCOSIDE-
DI-ALKYL-ORTHOCARBONATES]
Ulrich Stache, Hofheim, Taunus, Kurt Radscheit, Kelk-
heim, Taunus, Werner Haede, Hofheim, Taunus,
Werner Fritsch, Neuenhain, Taunus, and Ernst Lindner,
Frankfurt am Main, Germany, assignors to Farbwerke
Hoechst Aktiengesellschaft vormals Meister Lucius &
Bruning, Frankfurt am Main, Germany
No Drawing. Filed Dec. 4, 1970, Ser. No. 95,399
Claims priority, application Germany, Dec. 6, 1969,
P 19 61 389.9
Int. Cl. C07c 173/00
U.S. Cl. 260—210.5    10 Claims

ABSTRACT OF THE DISCLOSURE

Cardenolide- and bufadienolide-3-[glycoside-di-alkyl-othocarbonates] and process for their peparation by reaction of cardenolide- or bufadienolide-3-glycosides with a tetra- alkyl-orthocarbonate in the presence of acidic catalysts.

The present invention relates to cardiac glycoscides of steroids, the sugar portion of which carries an α-diol group in cis position which is linked thereto via a cyclic di-alkyl-orthocarbonate structure, as well as a process for the preparation of these compounds.

The process for the preparation of these cardenolide- or bufadienolide - 3-[glycoside-di-alkyl-orthocarbonates] comprises reacting cardenolide- or bufadienolide-3-glycosides, the glycoside component of which carries an α-diol group in cis position, with a tetra-alkyl-orthocarbonate of the general formula $$C(OR)_4$$

in which R represents a saturated or unsaturated aliphatic radical, in the presence of acidic catalysts.

The process of the invention is carried out according to the following reaction scheme, exemplified for the case of a cardenolide- or bufadienolide-3-monoglycoside, the glycoside radical of which is L-rhamnose:

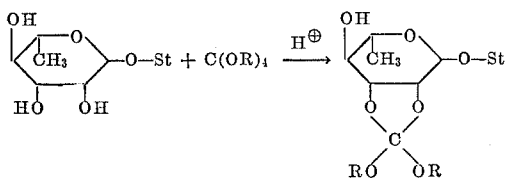

in which St stands for a steroid radical of the cardenolide- or bufadienolide series and R represents a saturated or unsaturated aliphatic radical.

The cardenolide- and bufadienolide-3-glycosides having a cis vicinal α-diol grouping in their glycoside component may be used according to the process of the invention in the form of 3-mono, 3-di or 3-trisacchrides. It is of no importance in which sugar the cis α-diol structure is present. The following functions, either single or multiple, may be present in the aglyconic as well as in the glycosidic portion of the cardenolide- and bufadienolide-3-glycosides: alcohol, ester, ether, aldehyde, ketone, carboxylic acid, carboxylic acid ester, oxido groups and/or double bonds. Aldehyde or ketone groups may also be present in the form of their derivatives as acetals, ketals, hydrazones or oximes. Suitable generally known cardenolide- and bufadienolide-3-glycosides which can be prepared according to known methods are, for example, the following compounds having a cis α-diol group in their glycoside component:

convallatoxin (=k-strophantidin+L-rhamnose)
convallatoxol (=k-strophantidol+L-rhamnose)
helvetocoside (=k-strophantidin+D-digitoxose)
k-strophantidol-3-D-digitoxide
desglucohellebrin (=hellebrigenin+L-rhamnose)
desglucohellebrol (=hellebrigenol+L-rhamnose)
hellebrin (=hellebrigenin+L-rhamnose+D-glucose)
proscillaridin A (=scillarenin+L-rhamnose)
scillarene A (=scillarenin+L-rhamnose+D-glucose)
canarigenin-3-D-digitoxide
evomonoside (=digitoxigenin+L-rhamnose)
digitoxigenin-3-rhamnoside
digitoxin (=digitoxigenin+3 moieties of D-digitoxose)
digoxin (=digoxigenin+3 moieties of D-digitoxose)
gitoxin (=gitoxigenin+3 moieties of D-digitoxose)
α-antiarin (=antiarigenin+antiarose)
gofruside (=corotoxigenin+allomethylose)
(19-carboxymethylene-periplogenin-5β-lactone)-3-L-rhamnoside.

Suitable tetra-alkyl-orthocarbonates are for example tetramethyl-, tetra-ethyl-, tetrapropyl-, tetrabutyl-, tetrapentyl-, tetrahexyl-, tetraheptyl-, tetra-octyl-, tetranonyl-, tetradenyl-orthocarbonate, tetra-allyl- or tetra-propargyl-orhocarbonate wherein the basic alcohols may be primary, secondary or tetriary alcohols. Especially advantageous are tetra-alkyl-derivatives having from 1 to 4 carbon atoms.

The tetra-alkyl-orthocarbonates may be prepared according to known methods.

The long-chain or unsaturated orthocarbonates are advantageously prepared by ester interchange of tetramethyl-, tetraethyl- or tetrapropyl-orthocarbonates with the corresponding alcohols.

Suitable acidic catalysts for the reaction are, above all, inorganic or organic acids, for example sulfuric acid, p-toluene-sulfonic acid, hydrochloric acid, trifluoro-acetic acid, formic acid, acetic acid or oxalic acid. Also substances having an acidic reaction may be used, for example pyridine hydrochloride, phosphoroxychloride boro-trifluorodie-etherate. Surprisingly, the use of these acids does not involve dehydration of the 14β-hydroxy group present in the cardenolides and bufadienolides.

As solvents, ethers are used advantageously, for example di-ethyl ether, tetrahydrofurane, dioxane, glycol-dimethyl ether, and di-ethyleneglycol-dimethyl ether; hydrocarbons, for example n-hexane, cyclohexane, benzene, toluene and xylene; tertiary acid amides, for example dimethylformamide and dimethylsulfoxide; halogenated hydrocarbons, for example methylene chloride, chloroform, carbon tetrachloride or carbon disulfide, or mixtures of these solvents. The reaction may also be carried out without addition of solvents.

The process of the invention is carried out in the following manner: The cardiac glycosides are suspended or dissolved in one of the aforementioned solvents, preferably in a solvent miscible with water, for example tetrahydrofurane, dioxane, dimethylformamide, dimethylsulfoxide. Subsequently; from 1 to 100, preferably from 2 to 10, molar equivalents of the tetra-alkyl-orthocarbonate as well as an inorganic or organic acid, or mixtures of these acids, are added. Advantageously, from 0.001 to 1 molar equivalent of the acid is used. The reaction mixture is stirred or allowed to stand at temperatures between —60° C. and the boiling temperatures of the solvents used or those of the orthocarbonates. Preferably, temperatures between 0° C. and 50° C. are chosen. The reaction time is different according to the special case, generally it may vary between 3 minutes and 20 hours.

The ester interchange, at temperatures of from 0° C. to 50° C., generally takes place at such a speed that after 10 seconds a considerable part of the cardiac glycoside-orthocarbonate has already formed. After complete reaction, it is possible to leave the reaction mixture to itself as long as desired (for example for 6 weeks), without the reaction products undergoing a chemical alteration worth mentioning. Thus, as a surprising fact, practically no dehydration of the 14β-hydroxy group has been observed under the cited reaction conditions, even after longer periods of letting the product stand.

If desired, the alcohols formed during the ester interchange may be removed continuously from the reaction mixture by fractional distillation; simultaneously one of the cited solvents may be used as an entrainer for water.

For the isolation of the products according to the process of the invention, the reaction mixture—when solvents are used which are miscible with water—is poured into water containing an excess base, for example, bicarbonate or pyridine, in order to neutralize the acid used. This operation causes precipitation of the reaction products in an oily form. These products can be isolated in their pure form by means of generally known extraction processes, and they are further purified by conventional recrystallization. In case the reaction is carried out at temperatures above 50° C. and as a consequence undesired by-products are formed and decoloration occurs, the reaction products may be obtained in their pure form by subsequent chromatography. When solvents are used which are not miscible with water, the reaction products are advantageously isolated by distilling off the solvents after neutralization of the acid, and by normally recrystallizing the residue or subjecting it to chromatography.

The yields depend, besides other factors, on the reaction conditions; at reaction temperatures of from 0° to 50° C., between 70% and 100% of the theoretical yield are obtained in most cases.

The products according to the process of the invention have valuable pharmacological properties. Animal tests may be carried out as the atrium test or as the K-excretion test on the isolated heart of guinea pigs. Thus, in animal tests, the cardenolide- and bufadienolide-3-[glycoside-di-alkyl-orthocarbonates] show a positively inotropic activity comparable to the cardiac glycosides used, but they often have a higher oral resorption rate than those glycosides. Further, pharmacologically important parameters such as duration of action, adhesion on the receptors of the heart muscle cell and cumulation are positively influenced by the introduction of the cyclic orthocarbonate structure into the glycoside component. Also, the products of the process of the invention excel by their substantially better lipid-solubility, as compared to the starting substances.

The new compounds are valuable therapeutic agents against cardiac insufficiency. The single dose for a human being may be from about 0.1 to 3 mg. per unit. The new compounds may be therapeutically administered above all in oral form as dragées, tablets or capsules, for which the usual pharmaceutical carriers, for example, starch, lactose, tragacanth, magnesium stearate and talcum, may be used. For intravenous injections, water or physiological sodium chloride solution may serve as solvents for the ampoules.

The following examples illustrate the invention. The melting points were determined by means of the Kofler heating block and are not corrected.

EXAMPLE 1

3.6 ml. of tetramethyl-orthocarbonate as well as 80 mg. of p-toluene-sulfonic acid are added to a solution of 800 mg. of proscillaridin A in 40 ml. of absolute dioxane. After 3 hours of stirring or remaining stationary at 20° C., the reaction mixture is introduced into 160 ml. of water containing sodium bicarbonate in excess. It is then extracted several times by means of methylene chloride or chloroform. The combined organic extracts are washed with water and dried with sodium sulfate. The organic solvents are distilled off in vacuo. The remaining residue is crystallized by means of digestion with about 30 ml. of di-iso-propyl ether. 874 mg. of proscillaridin A-2′,3′-dimethyl-orthocarbonate having a melting point of 185–187° C. are obtained. After recrystallization from acetone/ether, the product obtained shows a melting point of 192° C. Typical infrared bands (measured in KBr): 3500, 3440 (large), 1735, 1715, 1630, 1535, 1215, 1120, 1040, 990 cm.$^{-1}$.

In analogous manner there are prepared:

(a) from digitoxin, digitoxin-3‴,4‴-dimethyl-orthocarbonate having a melting point of 177–178° C. (after digestion with di-iso-propyl ether) and showing typical infrared bands (KBr) at 3500, 1780, 1740, 1615, 1215, 1155, 1115, 1065, 1010 and 990 cm.$^{-1}$;

(b) from helveticoside, helveticoside - 3′,4′ - dimethyl-orthocarbonate having a melting point of 218–220° C. (after digestion with di-isopropyl ether) and showing typical infrared bands (KBr) at 3510, 2750, 1780, 1740, 1715, 1620, 1215, 1120 (large), 1080 (large), 1025 and 990 cm.$^{-1}$;

(c) from evomonoside, evomonoside - 2′,3′ - dimethyl-orthocarbonate having a melting point of 200–210° C. (not typical, after digestion with di-isopropyl ether) and showing typical infrared bands (KBr) at 3500, 1775, 1740, 1625, 1215, 1180, 1125, 1055, 1025 and 990 cm.$^{-1}$;

(d) from convallatoxin, convallatoxin-2′,3′-dimethyl-orthocarbonate (pseudo-crystalline after trituration with di-isopropyl ether). Typical infrared bands (KBr) at 3480, 2775, 1780, 1740, 1620, 1215, 1170, 1125, 1030, 990 cm.$^{-1}$;

(e) from convallatoxol, convallatoxol-2′,3′-dimethyl-orthocarbonate having a melting point of 223–231° C. (after digestion with di-ethyl ether) and showing typical infrared bands (KBr) at 3480–3460, 1775, 1740, 1625, 1215, 1175, 1120, 1030 and 990 cm.$^{-1}$;

(f) from desglucohellebrin, desglucohellebrin - 2′,3′ - dimethyl - orthocarbonate (pseudo - crystalline after trituration with di-isopropyl ether) showing the typical infrared bands (KBr) at 3490–3480, 2775, 1735, 1715–1710, 1630, 1530, 1215, 1170, 1125, 1035, 990 cm.$^{-1}$.

EXAMPLE 2

3.14 ml. of tetra-ethyl-orthocarbonate and 57 mg. of p-toluene-sulfonic acid are added to a solution of 530 mg. of proscillaridin A in 25 ml. of absolute dioxane. After 2 hours of stirring or remaining stationary at 20° C., the reaction mixture is introduced into 100 ml. of water containing sodium bicarbonate in excess. It is then extracted several times with methylene chloride or chloroform. The combined organic extracts are washed with water, dried with sodium sulfate, and the organic solvents are distilled off in vacuo. The residue obtained is crystallized by digestion with about 20 ml. of di-isopropyl ether. 512 mg. of proscillaridin A-2′,3′-di-ethyl-orthocarbonate having a melting point of 134–137° are obtained.

Typical infrared bands (KBr): 3470, 1740, 1710–1720, 1630, 1535, 1195 and 1170 (shoulders), 1125, 1045, 1000 cm.$^{-1}$.

In analogous manner there are prepared:

(a) from convallatoxin, convallatoxin-2′,3′-di - ethyl - orthocarbonate having a melting point of 182–186° C. (after digestion with ether) and showing typical infrared bands (KBr) at: 3490, 2740, 1780, 1750 and 1715 (shoulders), 1735, 1620, 1200, 1170, 1130, 1065, 1030, 990 cm.$^{-1}$;

(b) from digitoxin, digitoxin-3‴,4‴-di-ethyl-ortho - carbonate having a melting point of 150–154° C. (after digestion with ether) and showing typical infrared bands (KBr) at: 3480, 1780, 1735, 1620, 1255, 1155, 1120, 1060, 1010 cm.$^{-1}$;

(c) from (19-carboxymethylene-periplogenin-5β-lactone)-3-L-rhamoside, (19-carboxymethylene-periplogenin-5β-lactone)-3-(L-rhamnoside-2',3'-di-ethyl - orthocarbonate) having a melting point of 204–210° C. (after digestion with ether) and showing typical infrared bands (KBr) at: 3470, 1775, 1730 (large), 1615, 1195, 1180, 1130, 1070, 1025, 985 cm.$^{-1}$;

(d) from evomonoside, the evomonoside-2',3'-di-ethyl-orthocarbonate having a melting point of 110–113° C. (after digestion with ether/n-hexane) and showing typical infrared bands (KBr) at: 3470, 1780, 1735, 1620, 1200 and 1170 (shoulders), 1125, 1040, 1000 cm.$^{-1}$;

(e) from desglucohellebrin, desglucohellebrin-2',3'-di-ethyl-orthocarbonate (pseudo-crystalline after trituration with di-iso-propyl ether). Typical infrared bands (KBr) at: 3480, 2775, 1735, 1710–1720, 1630, 1535, 1190, 1165, 1125, 1050, 1000 cm.$^{-1}$;

(f) from helveticoside, helveticoside-3',4'-di-ethyl-orthocarbonate having a melting point of 98–100° C. (triturated with n-hexane) and showing typical infrared bands (KBr) at: 3500, 2775, 1780, 1745, 1715, 1620, 1200 (shoulder), 1170, 1135, 1070, 1025, 990 cm.$^{-1}$;

(g) from convallatoxol, convallatoxol-2',3'-di-ethyl-orthocarbonate having a melting point of 193–197° C. (fater digestion with ether) and showing typical infrared bands (KBr) at: 3470 (large), 1775, 1745, 1715, 1620, 1200, 1170, 1125, 1060, 1030, 990 cm.$^{-1}$;

EXAMPLE 3

A solution of 400 mg. of proscillaridin A in 20 ml. of absolute dioxane is esterified with 1.8 ml. of tetra-n-propyl-orthocarbonate as well as 40 mg. of p-toluene-sulfonic acid. After remaining stationary for 3 hours at 20° C., the whole is poured onto 80 ml. of water containing sodium bicarbonate in excess and worked up as described in Example 1. After digestion of the residue with di-isopropyl ether, 396 mg. of proscillaridin A–2',3'-di-(n-propyl)-orthocarbonate having a melting point of 136–140° C. (wide sintering range) are obtained.

Typical infrared bands (KBr): 3470, 1735, 1715, 1710, 1630, 1535, 1185 (shoulder), 1165, 1115, 1045, 990 cm.$^{-1}$.

In analogous manner, there are prepared:

(a) from digitoxin, digitoxin-3''',4'''-di-(n-propyl)-orthocarbonate having a melting point of 160–165° C. (wide sintering range) and showing typical infrared bands (KBr) at: 3500, 1780, 1745, 1620, 1155, 1120, 1060, 1010, 990 cm.$^{-1}$;

(b) from evomonoside, the evomonoside-2',3' - di - (n-propyl)-orthocarbonate as a non-crystallizing oil. Typical infrared bands (as oil): 3500, 1780, 1720–1735, 1620, 1160, 1130, 1065, 1020, 1000 cm.$^{-1}$.

EXAMPLE 4

0.9 ml. of tetra-n-butyl-orthocarbonate and 15 mg. of p-toluene-sulfonic acid are added to a solution of 200 mg. of proscillaridin A in 10 ml. of absolute dioxane. After remaining stationary for 3 hours at 20°, the whole is poured onto 40 ml. of water containing sodium bicarbonate in excess and worked up as described in Example 1. After digestion of the residue with at first di-iso-propyl ether and then-n-hexane, 112 mg. of proscillaridin A–2',3'-di-n-(n-butyl)-orthocarbonate having a melting point of 112–118° C. (wide sintering range) are obtained.

Typical infrared bands (KBr): 3470, 1740, 1710, 1630, 1535, 1185, and 1165 (shoulders), 1120, 1050, 990 cm.$^{-1}$.

EXAMPLE 5

A suspension of 400 mg. of digoxin in 40 ml. of absolute dioxane is stirred for 16 hours at 20° C. with 1.8 ml. of tetramethyl-orthocarbonate as well as 50 mg. of p-toluene-sulfonic acid. Subsequently, the reaction mixture is filtered into water containing sodium bicarbonate in excess via a clarifying layer filter and worked up as described in Example 1. After digestion of the residue with di-isopropyl ether, digoxin-3''',4'''-dimethyl-orthocarbonate is obtained in form of an amorphous product which can be filtered off.

Typical infrared bands (KBr): 3490, 1780, 1740, 1620, 1210, 1160, 1115, 1075, 1010, 990 cm.$^{-1}$.

In case gitoxin is used instead of digoxin, while working in the same manner, gitoxin-3''',4'''-dimethyl-orthocarbonate is obtained.

EXAMPLE 6

In analogous manner as described in Example 5, 400 mg. of digoxin are reacted with 2 ml. of tetra-ethyl-orthocarbonate and further treated. Digoxin-3''',4'''-diethyl-orthocarbonate is obtained in from of an amorphous product which can be filtered off.

Typical infrared bands (KBr): 3480, 1775, 1735, 1720, 1160, 1115, 1060, 1010, 990 cm.$^{-1}$.

In analogous manner, gitoxin-3''',4'''-diethyl-orthocarbonate is obtained in case gitoxin is used instead of digoxin.

EXAMPLE 7

In analogous manner as described in Example 5, 400 mg. of digoxin are reacted with 2 ml. of tetra-(n-propyl)-orthocarbonate and further treated. Digoxin-3''',4'''-di - (n-propyl)-orthocarbonate is obtained in form of an amorphous product which can be filtered off.

Typical infrared bands (KBr): 3470, 1780, 1740, 1625, 1070, 1010, 990 cm.$^{-1}$.

In analogous manner, gitoxin-3''',4'''-di-(n-propyl)-orthocarbonate is obtained in case gitoxin is used instead of digoxin.

What is claimed is:

1. A method for preparing cardenolide-and bufadienolide-3-[glycoside-di-alkyl-orthocarbonates], which method comprises reacting a cardenolide- or bufadienolide-3-glycoside, wherein the cardenolide or bufadienolide has a 14-β-hydroxy group and the glycoside component has an α-diol group in the cis-position, with an orthocarbonate of the formula $C(OR)_4$, wherein R is allyl, propargyl, or alkyl having 1 to 4 carbon atoms, in the presence of an acidic catalyst.

2. A 14-β-hydroxy-cardenolide-3-[glycoside-di - alkyl-orthocarbonate] or a 14-β-hydroxy-bufatrienolide-3-[glycoside-di-alkyl-orthocarbonate], wherein the alkyl groups have from 1 to 4 carbon atoms.

3. Proscillaridin A–2',3'-dimethyl-orthocarbonate.
4. Digitoxin-3''',4'''-dimethyl-orthocarbonate.
5. Proscillaridin A–2',3'-di-ethyl-orthocarbonate.
6. Helveticoside-3',4'-dimethyl-orthocarbonate.
7. Evonomonoside-2',3'-dimethyl-orthocarbonate.
8. Evonomonoside-2',3'-di-ethyl-orthocarbonate.
9. Proscillaridin A–2',3'-di-(n-propyl)-orthocarbonate.
10. Proscillaridin A–2',3'-di-(n-butyl)-orthocarbonate.

References Cited

UNITED STATES PATENTS 3,471,470   10/1969   Heider et al.   260—210.5
3,476,742   11/1969   Voigtlander et al.   260—210.5
3,531,462   9/1970   Satoh et al.   260—210.5

LEWIS GOTTS, Primary Examiner

J. R. BROWN, Assistant Examiner

U.S. Cl. X.R.

424—182